United States Patent
Perry

(10) Patent No.: US 9,294,026 B2
(45) Date of Patent: Mar. 22, 2016

(54) METHOD OF OPERATING A POWER GENERATION SYSTEM

(75) Inventor: Michael L. Perry, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/364,781

(22) PCT Filed: Dec. 20, 2011

(86) PCT No.: PCT/US2011/066116
§ 371 (c)(1),
(2), (4) Date: Jun. 12, 2014

(87) PCT Pub. No.: WO2013/095372
PCT Pub. Date: Jun. 27, 2013

(65) Prior Publication Data
US 2014/0375056 A1 Dec. 25, 2014

(51) Int. Cl.
| | |
|---|---|
| H01M 6/42 | (2006.01) |
| H02P 9/00 | (2006.01) |
| H02J 7/34 | (2006.01) |
| H01M 8/18 | (2006.01) |
| H02J 3/32 | (2006.01) |
| H02J 3/38 | (2006.01) |
| H02P 101/15 | (2015.01) |

(52) U.S. Cl.
CPC ............... *H02P 9/008* (2013.01); *H01M 8/188* (2013.01); *H02J 7/34* (2013.01); *H02J 3/32* (2013.01); *H02J 3/386* (2013.01); *H02P 2101/15* (2015.01); *Y02E 10/763* (2013.01)

(58) Field of Classification Search
CPC ....................................................... H01M 10/44
See application file for complete search history.

(56) References Cited

U.S. PATENT DOCUMENTS

| | | | |
|---|---|---|---|
| 4,482,614 A | 11/1984 | Zito, Jr. | |
| 5,547,775 A * | 8/1996 | Eguchi et al. | 320/118 |
| 7,855,467 B2 * | 12/2010 | Kawazoe et al. | 290/44 |
| 2005/0244707 A1 * | 11/2005 | Skyllas-Kazacos et al. | 429/105 |
| 2007/0014657 A1 | 1/2007 | Parera | |
| 2007/0120369 A1 | 5/2007 | Delmerico et al. | |
| 2008/0292964 A1 * | 11/2008 | Kazacos et al. | 429/231.5 |
| 2009/0282840 A1 * | 11/2009 | Chen et al. | 62/50.3 |
| 2010/0253278 A1 | 10/2010 | Chang et al. | |
| 2015/0099206 A1 * | 4/2015 | Horne et al. | 429/456 |

FOREIGN PATENT DOCUMENTS

| | | |
|---|---|---|
| EP | 1772939 A2 * | 4/2007 |
| GB | 2424926 A * | 10/2006 |
| WO | 2008148148 A1 | 12/2008 |

OTHER PUBLICATIONS

International Preliminary Report on Patentability for International Application No. PCT/US2011/066116 mailed on Jul. 3, 2014.
International Search Report and Written Opinion for International Application No. PCT/US2011/066116 completed on Apr. 12, 2012.

* cited by examiner

*Primary Examiner* — Joseph Waks
(74) *Attorney, Agent, or Firm* — Carlson, Gaskey & Olds, P.C.

(57) ABSTRACT

A method of operating a power generation system includes operating a power generation system to generate an electric power output. At least a portion of the electric power output is dissipated in a flow battery by charging the flow battery using the portion of the electric power output and self-discharging the flow battery.

17 Claims, 1 Drawing Sheet

METHOD OF OPERATING A POWER GENERATION SYSTEM

BACKGROUND

This disclosure relates to power generation systems and, more particularly, to controlling electrical output of a power generation system.

Power generation systems, such as those that include wind turbines, are known and used to convert mechanical energy into electric output. For instance, a conventional wind turbine includes a plurality of turbine blades that rotate to drive a generator that produces an electric output. In periods of extreme wind conditions, the turbine blades are typically feathered to reduce mechanical stresses on the blades and mitigate electrical loads on the system.

SUMMARY

Disclosed is a method of operating a power generation system that includes operating a power generation system to generate an electric power output. At least a portion of the electric power output is dissipated in a flow battery by charging the flow battery using the portion of the electric power output and self-discharging the flow battery.

Also disclosed is a power generation system that includes a generator, a plurality of rotatable airfoils that are coupled to drive the generator to provide an electric power output and a flow battery that is selectively electrically connectable with the electric power output. The flow battery is operable for charging, discharging, and self-discharging. A controller is configured to selectively dissipate in the flow battery at least a portion of the electric power output by charging and self-discharging the flow battery.

Also disclosed is a method of operating a flow battery. The method includes operating a flow battery in one of at least three operational states that include a charging state in which a net charge level of the flow battery is increased by an input electrical power, a discharging state in which the net charge level is decreased by an output electrical power from the flow battery and a dissipation state in which the flow battery charges and self-discharges to dissipate received electrical power while the net charge level stays relatively constant.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
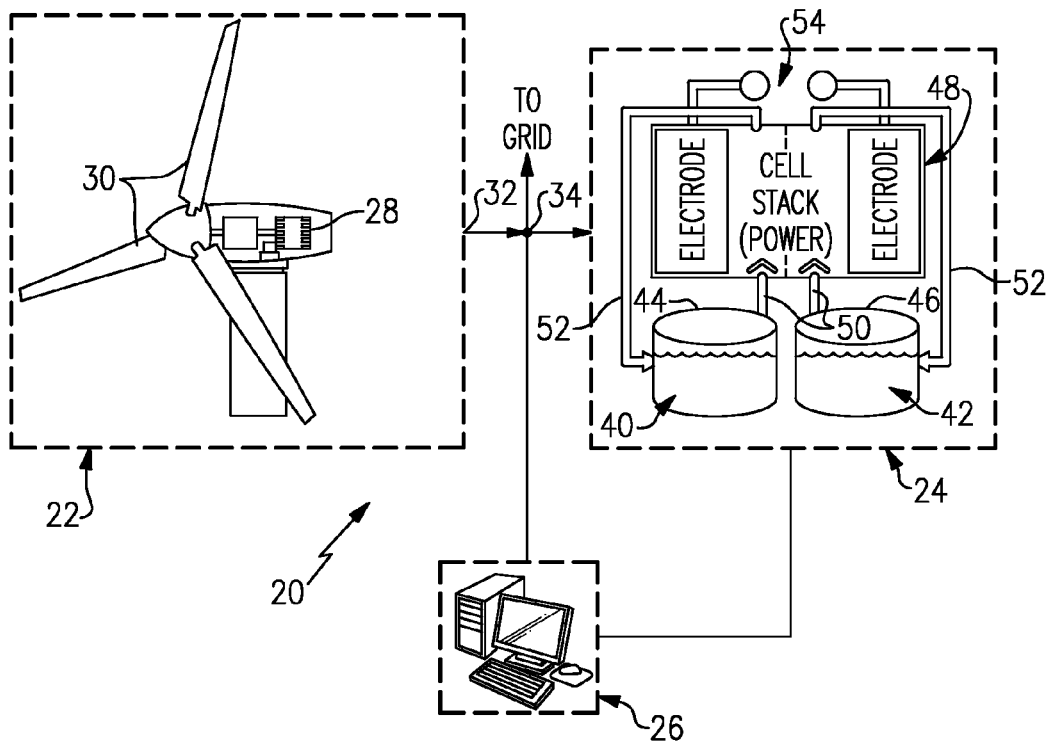
FIG. 1 illustrates an example power generation system that includes a flow battery for dissipating electrical output.

FIG. 1 illustrates selected portions of an example power generation system 20. It will be appreciated from the following description and figures that the power generation system 20 includes features for controlling an electrical output under certain predetermined circumstances. Thus, the power generation system 20 is more efficient and less costly than prior systems.

In this example, the power generation system 20 is a wind turbine power generation system, although it is to be understood that the disclosed examples are non-limiting and other power generation systems will also benefit from this disclosure. As shown, the power generation system 20 includes a wind turbine 22, a flow battery 24 and a controller 26. In this example, the wind turbine 22 includes a generator 28 and a plurality of rotatable airfoils 30 that are coupled to drive the generator 28 to provide an electric power output 32. Another example would be a turbine, or some other power generation system, located in the ocean or a river. In other examples that are not wind or water turbines, the airfoils 30 are within a turbine apparatus that extracts energy from fluid expansion to drive the generator 28.

The flow battery 24 is selectively electrically connectable through node 34 with the wind turbine 22. In this example, the controller 26 is connected to the node 34 and to the flow battery 24 to control the operation thereof. The controller 26 includes software, hardware or both. In one example, the controller 26 is a computer that has software to control the operation of the node 34 and flow battery 24. Given this description, one skilled in the art would understand how to implement the disclosed controller 26.

The flow battery 24 includes a liquid electrolyte 40 that has an electrochemically active specie that functions in a redox pair with regard to an additional liquid electrolyte 42 and electrochemically active specie. For example, the electrochemically active species are based on vanadium, bromine, iron, chromium, zinc, cerium, lead or combinations thereof. In embodiments, the liquid electrolytes 40 and 42 are aqueous solutions that include one or more of the electrochemically active species.

The liquid electrolytes 40 and 42 are contained in respective storage tanks 44 and 46. As shown, the storage tanks 44 and 46 are substantially equivalent cylindrical storage tanks; however, the storage tanks 44 and 46 can alternatively have other shapes and sizes.

The liquid electrolytes 40 and 42 are delivered (e.g., pumped) to one or more cells 48 through respective feed lines 50 and a return from the cell or cells 48 to the storage tanks 44 and 46 via return lines 52. The flow battery 24 is distinguished from fuel cells, conventional batteries or other electrochemical devices by, inter alia, the use of the externally-supplied, liquid electrolytes 40 and 42 that participate in a reversible electrochemical reaction in the one or more cells 48.

In operation, the liquid electrolytes 40 and 42 are delivered or pumped to the one or more cells 48 to either convert electrical energy into chemical energy or convert chemical energy into electrical energy that can be discharged. The electrical energy is transmitted to and from the one or more cells 48 through an electrical pathway 54 that completes the circuit and allows the completion of the electrochemical redox reactions.

The "modes" or states of converting electrical energy into chemical energy or converting chemical energy into electrical energy are normally referred to as, respectively, a charging mode or state and a discharging mode or state. In the charging mode, the flow battery 24 receives external electrical power as an input and stores this power as chemical energy in the liquid electrolytes 40 and 42 such that a charge level of the flow battery 24 increases. In the discharging mode, the flow battery 20 converts the stored chemical energy into electrical power that is discharged externally through the electrical pathway 54 such that the charge level of the flow battery 24 decreases.

Under normal conditions when wind is not excessive relative to customer demand and the flow battery has the ability to provide energy or receive it as desired, then the flow battery 24 operates in either the charging mode or the discharging mode. In this regard, the flow battery 24 functions to "time shift" or "smooth" the electrical power output 32 of the wind turbine 22 or other power generator. The flow battery 24 converts the chemical energy into electrical energy for supply to an electric grid, for example when the wind turbine 22 output is less than desired by the customer or the electrical grid.

In the disclosed example, the flow battery 24 also has a third mode or state, a dissipation mode. In dissipation mode, the flow battery 24 does not substantially gain or lose charge from its instant charge level. Instead, the flow battery 24 receives an external electrical input and self-discharges to dissipate the received electrical input such that there is no substantial net gain or loss in the instant charge level of the flow battery 24. In other examples, the charge level can change if the amount of received electric input exceeds the self-discharge, or vice-versa. Thus, the flow battery 24 can be operated in at least three operational states including the charging mode, the discharging mode, and the dissipation mode.

There can be various reasons where it would be desirable to dissipate at least a portion of the electrical power output 32 from the wind turbine 22. In such instances, at least a portion of the electrical power output 32 is dissipated in the flow battery 24. The controller 26 controls the modes of the flow battery 24 and selectively connects the flow battery 24 with the electrical power output 32 from the wind turbine 22 by way of the node 34. Thus, the controller 26 can control whether the electrical power output 32 goes to the flow battery 24 or to the grid through node 34.

In this regard, the controller 26 also controls a charge level of the flow battery 24 during a period when the portion of the electric power 32 is not being dissipated in the flow battery 24 such that the charge level is less than 100% full capacity. In one example, the controller 26, controls the charge level to be between 10-90% of full capacity during most periods and 70-90% during the period when the portion of the electric power is not being dissipated in the flow battery 24 to ensure that the flow battery 24 has at all times a capacity to accept the electric power output 32 and operate in the dissipation mode should there be a temporary net increase in charge level. For instance, the controller 26 ceases charging when the charge level meets the predetermined charge level range and switches into the charge mode or dissipation mode if the charge level moves out of the range.

When there is a desire to dissipate at least a portion of the electric power output 32 from the wind turbine 22, the controller 26 electrically connects the flow battery 24 with the electric power output 32. The electric power output 32 from the wind turbine 22 is received into the flow battery 24 by way of the electrical pathway 54. Normally, a received electrical input into the flow battery 24 coupled with flow of the liquid electrolytes 40 and 42 through the cell 48 would serve to increase the charge level of the flow battery 24. However, the controller 26 is also connected to control the operation of the flow battery 24 and thereby commands the flow battery 24 to dissipate the received electric power output 32 of the wind turbine 22. Thus, the overall charge level of the flow battery 24 does not substantially change and the dissipation mode can thereby be continued indefinitely.

The dissipation of at least a portion of the electric power output 32 from the wind turbine 22 is achieved through any number of different mechanisms in the flow battery 24. In one example, the liquid electrolytes 40 and 42 are mixed together in response to a command from the controller 26. In that regard, additional pumps and/or valves may be used to move one of the liquid electrolytes 40 or 42 into the storage tank of the other. Unlike other types of electrochemical devices where mixing of the reactants would irreversibly destroy the device, the liquid electrolytes 40 and 42 of the flow battery 24 are selected such that there is no damage to the flow battery 24 upon mixing. For instance, the liquid electrolytes 40 and 42 are based on the same chemical element, such as any of the above mentioned chemical elements. As an example, the liquid electrolytes 40 and 42 are based upon vanadium such that the only difference between the vanadium of the liquid electrolyte 40 and the vanadium of the liquid electrolyte 42 is the oxidation state. Thus, by mixing the liquid electrolytes 40 and 42 together, the oxidation states merely equilibrate and can subsequently be converted back to the original oxidation state upon circulation through the one or more cells 48 in the charging or discharging mode. The mixing therefore does not cause any permanent damage to the flow battery 24.

In another example, the controller 26 operates the flow battery 24 to increase one or more parasitic electrical loads on the flow battery 24 to dissipate the electric power output 32. Parasitic electrical loads are components, for example, that utilize electrical power from the flow battery 24. Thus, an increase in the parasitic electrical load of the flow battery 24 uses up at least a portion of the received electrical power output 32. In one example, the controller 26 controls pumps and/or valves within the flow battery 24 at relatively high speeds or inefficient operating conditions in order to increase or maximize the parasitic electrical load on the flow battery 24.

In another example, the controller 26 decouples the electric pathway 54 and also causes the liquid electrolyte 40, the liquid electrolyte 42 or both to circulate through the one or more cells 48 without providing an electrical output from the flow battery 24. At least a portion of the electrochemically active species diffuses through the separator in the cell (the separator can be an ion-exchange membrane, for example) in the one or more cells 48 and thus cause self-discharging of the flow battery 24. This reactant "crossover" through the separator can be increased by imposing a pressure gradient across the separator, either while on load/charge or without a load/charge.

There can be a variety of circumstances that trigger the controller 26 to dissipate the electrical power output 32 of the wind turbine 22 in the flow battery 24 as described. In one example, the controller 26 dissipates the electrical power output 32 in response to the output 32 exceeding a predetermined threshold. As an example, under extreme wind speeds that exceed a predetermined threshold wind speed, the turbine airfoils 30 and generator 28 produce an output 32 that exceeds the predetermined threshold electrical output. In order to reduce the output 32 to the grid, protect electrical components of the wind turbine 22 and mechanically reduce stresses on the wind turbine 22, the controller 26 dissipates at least a portion of the electrical power output 32 in the flow battery 24 as described above. Thus, the controller 26 provides continual protection of the wind turbine 22 with minimal additional hardware or detrimental impact on to the charging and discharging modes of the flow battery 24.

In another example, the controller 26 dissipates at least a portion of the electrical power output 32 in response to a detected wind speed exceeding a predetermined threshold wind speed. For instance, if the wind speed exceeds a predetermined threshold wind speed over a certain period of time, the controller 26 dissipates at least a portion of electric power output 32 in the flow battery 24.

In another example, the controller 26 dissipates at least a portion of the electric power output 32 in the flow battery 24 as described above in response to a negative cost of electricity of the electric grid. That is, during certain time periods, such as overnight, there is a relatively low demand for electricity on the electric grid. In such a circumstance, the cost of electricity supplied to the grid may be negative. In other words, instead of selling electricity to the grid, electrical producers would be paying to supply electricity to the grid. In response to this negative cost electricity circumstance, the controller 26 causes the electric power output 32 to be dissipated in the flow battery 24 instead of sold to the grid at a loss. From a cost standpoint to the system 20, it is more economical to dissipate the electrical power output 32 than to sell it at a loss.

Figure 2:
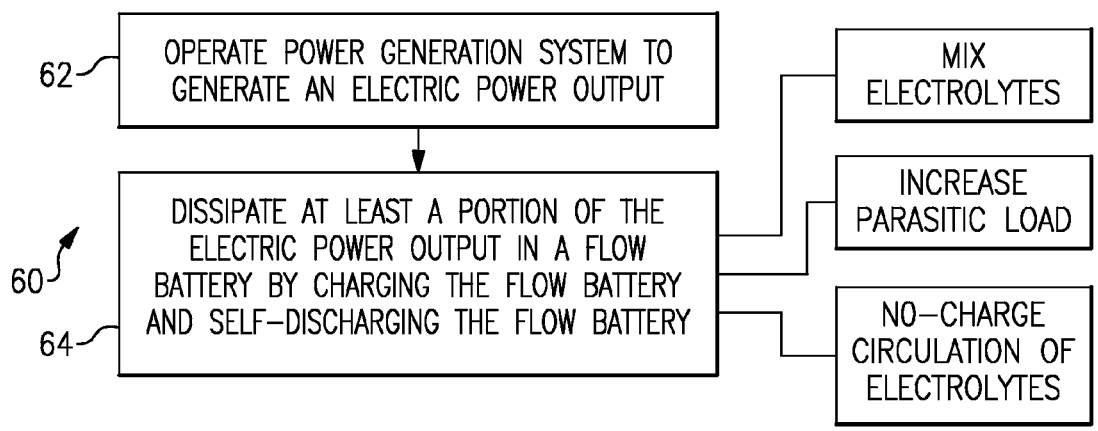
FIG. 2 illustrates an example method for operating a power generation system.

FIG. 2 illustrates a method 60 of operating a power generation system, such as power generation system 20 described above. That is, the power generation system 20 embodies the method 60. As shown, the method 60 includes a step 62 of operating the power generation system 20 to generate an electric power output 32. At step 64, the method 60 includes dissipating at least a portion of electric power output 32 in the flow battery 24 by charging the flow battery and self-discharging the flow battery 24. As also shown, the method 60 can optionally include mixing the liquid electrolytes 40 and 42, increasing parasitic loads on the flow battery 24 and circulating the liquid electrolytes 40 and 42 in a no-charge state to thereby dissipate the electrical power output 32.

For example, the flow battery can be operated in the dissipative mode taught herein even in the absence of a wind turbine. This method of operation may be advantageous in any situation where the price of electricity is negative or the presence of an always-available electrical load is desirable.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of operating a power generation system, the method comprising:
   operating a power generation system to generate an electric power output; and
   dissipating at least a portion of the electric power output in a flow battery by charging the flow battery using the portion of the electric power output from the power generation system and self-discharging the flow battery, wherein the charging of the flow battery and the self-discharging of the flow battery overlap in time.

2. The method as recited in claim 1, including dissipating at least a portion of the electric power output in the flow battery in response to the electric power output exceeding a predetermined threshold.

3. The method as recited in claim 1, including dissipating at least a portion of the electric power output in the flow battery in response to a negative cost of electricity to an electric grid.

4. The method as recited in claim 1, including dissipating at least a portion of the electric power output in the flow battery in response to a wind speed exceeding a predetermined threshold wind speed.

5. The method as recited in claim 1, wherein the self-discharging includes mixing together positive and negative liquid electrolytes of the flow battery.

6. The method as recited in claim 1, wherein the self-discharging includes increasing a parasitic electrical load on the flow battery.

7. The method as recited in claim 1, wherein the self-discharging includes circulating at least one liquid electrolyte through a cell of the flow battery without providing an electric output from the flow battery.

8. The method as recited in claim 1, including controlling a charge level of the flow battery during a period when the portion of the electric power is not being dissipated in the flow battery such that the charge level is less than 100%.

9. The method as recited in claim 8, including controlling the charge level to be 70-90% during the period when the portion of the electric power is not being dissipated in the flow battery.

10. The method as recited in claim 1, wherein the self-discharging includes increasing a parasitic electrical load on the flow battery by operating components that utilize electric power from the flow battery.

11. The method as recited in claim 10, wherein the self-discharging of the flow battery includes increasing the parasitic electrical load by operating the components at an increasingly inefficient operating condition.

12. The method as recited in claim 1, wherein the flow battery includes one or more cells, first and second storage tanks external of the one or more cells and connected to the one or more cells by feed lines, and first and second liquid electrolytes in, respectively, the first and second storage tanks.

13. A power generation system comprising:
   a generator;
   a plurality of rotatable airfoils that are coupled to drive the generator to provide an electric power output;
   a flow battery that is selectively electrically connectable with the electric power output, the flow battery being operable for charging and self-discharging; and
   a controller configured to selectively dissipate in the flow battery at least a portion of the electric power output by simultaneously charging and self-discharging the flow battery.

14. The power generation system as recited in claim 13, wherein the flow battery includes one or more cells, first and second storage tanks external of the one or more cells and connected to the one or more cells by feed lines, and first and second liquid electrolytes in, respectively, the first and second storage tanks.

15. A method of operating a power generation system, the method comprising:
   operating a power generation system to generate an electric power output; and
   dissipating at least a portion of the electric power output in a flow battery by charging the flow battery using the portion of the electric power output from the power generation system and simultaneously self-discharging the flow battery by:
   mixing together positive and negative liquid electrolytes of the flow battery,
   increasing a parasitic electrical load on the flow battery by operating components that utilize electric power from the flow battery, or
   circulating at least one liquid electrolyte through a cell of the flow battery without providing an electric output from the flow battery.

16. The method as recited in claim 15, wherein the self-discharging of the flow battery includes increasing the parasitic electrical load by operating the components at an increasingly inefficient operating condition.

17. The method as recited in claim 16, wherein the charging and the self-discharging of the flow battery cause no net gain or loss in an instant charge level of the flow battery.

* * * * *